(12) United States Patent
Gokemeijer et al.

(10) Patent No.: US 8,787,126 B2
(45) Date of Patent: Jul. 22, 2014

(54) WAVEGUIDE WITH BLOCKING LAYER

(75) Inventors: Nils Jan Gokemeijer, Edina, MN (US); William Albert Challener, Glenville, NY (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 13/269,809

(22) Filed: Oct. 10, 2011

(65) Prior Publication Data

US 2013/0088944 A1  Apr. 11, 2013

(51) Int. Cl.
*G11B 11/105*  (2006.01)
*G11B 5/127*  (2006.01)

(52) U.S. Cl.
USPC ............... 369/13.32; 369/13.24; 360/114.02; 360/59

(58) Field of Classification Search
USPC .......... 369/13.02, 13.05, 13.24, 13.34, 13.33; 360/114.02, 123.36, 59
See application file for complete search history.

(56) References Cited

U.S. PATENT DOCUMENTS

| | | | |
|---|---|---|---|
| 6,490,117 B1 | 12/2002 | Sacks et al. | |
| 6,944,112 B2 | 9/2005 | Challener | |
| 7,042,810 B2* | 5/2006 | Akiyama et al. | 369/13.33 |
| 7,158,330 B2 | 1/2007 | Morris et al. | |
| 7,643,248 B2 | 1/2010 | Sluzewski | |
| 8,098,547 B2* | 1/2012 | Komura et al. | 369/13.33 |
| 2003/0198146 A1* | 10/2003 | Rottmayer et al. | 369/13.13 |
| 2004/0001420 A1* | 1/2004 | Challener | 369/112.27 |
| 2006/0187564 A1* | 8/2006 | Sato et al. | 360/59 |
| 2008/0232225 A1* | 9/2008 | Cho et al. | 369/112.27 |
| 2009/0165285 A1* | 7/2009 | Takayama et al. | 29/603.09 |
| 2009/0208171 A1* | 8/2009 | Gage et al. | 385/37 |
| 2009/0225464 A1* | 9/2009 | Juang et al. | 360/59 |
| 2011/0170381 A1* | 7/2011 | Matsumoto | 369/13.33 |

* cited by examiner

*Primary Examiner* — Thomas Alunkal
(74) *Attorney, Agent, or Firm* — Hall Estill Attorneys at Law

(57) ABSTRACT

An apparatus includes a write pole, a waveguide adjacent to the write pole, the waveguide having a truncated end, and a blocking layer positioned adjacent the truncated end and extending from one side of the waveguide across a portion of an aperture at the truncated end. The waveguide can be a solid immersion mirror or a channel waveguide.

20 Claims, 7 Drawing Sheets

WAVEGUIDE WITH BLOCKING LAYER

BACKGROUND

In thermally-assisted magnetic recording, also called heat-assisted magnetic recording, information bits are recorded on a data storage medium at elevated temperatures, and the data bit dimensions can be determined by the dimensions of the heated area in the storage medium or the dimensions of an area of the storage medium that is subjected to a magnetic field. In one approach, a portion of the medium is heated to reduce the magnetic coercivity, and data is then written to the reduced coercivity region.

The data is stored and retrieved by a transducer, or "head," that is positioned over a desired track under control of a closed-loop servo system based on position information, or "servo data," which is stored within dedicated servo fields located on the storage medium. The servo fields can be interleaved with data sectors on the disc surface or can be located on a separate disc surface that is dedicated to storing servo information. Typically, servo-track writing is done with a head significantly wider than the recording head with subsequent tracks overlapping to provide complete servo information over the entire disk from the inner diameter to the outer diameter. The critical importance for servo-track writing is that the tracks have sharp edges.

The use of overlapping, or shingled, tracks has also been proposed to increase data storage density. For shingle write recording, a wide initial track is written, and only an edge of that track remains after the track adjacent to it is written.

Two types of optical structures have been proposed for use in heat-assisted magnetic recording ("HAMR") recording heads. A Solid Immersion Mirror-only ("SIM-only") structure can be used to produce a diffraction-limited spot of optical energy. A Near Field Transducer ("NFT") structure includes a Near Field Transducer that can concentrate optical energy in a very small spot. Widening the track of a SIM-only head while preserving the same edge sharpness is not trivial, because reducing the focusing of the optical spot would also reduce the optical gradient at the edge of the track. Widening the track of an NFT head is not trivial because the power delivered by the NFT to the media scales linearly with the width of the track. Doubling the track width would require double the power, possibly beyond the capabilities of the light delivery system.

There is a need for a HAMR recording head that can be used for writing servo tracks or overlapping tracks.

SUMMARY

One aspect of the present disclosure provides an apparatus including a write pole, a waveguide adjacent to the write pole, the waveguide having a truncated end, and a blocking layer positioned adjacent the truncated end and extending from one side of the waveguide across a portion of an aperture at the truncated end.

These and other features and advantages which characterize the various embodiments of the present disclosure can be understood in view of the following detailed description and the accompanying drawings.

DETAILED DESCRIPTION

Figure 1:
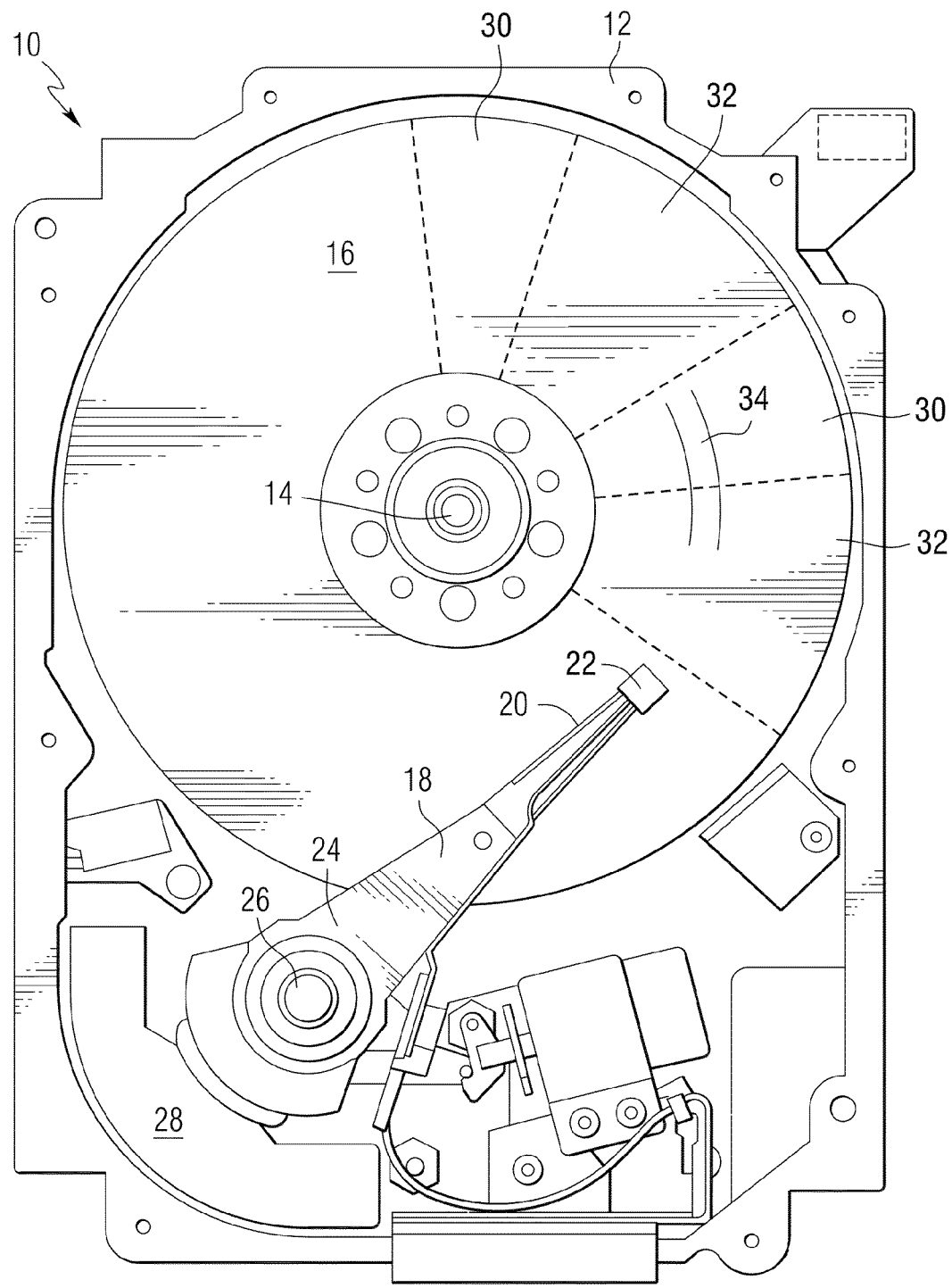
FIG. 1 is a pictorial representation of the mechanical portion of a disc drive that can be constructed in accordance with an embodiment of the disclosure.

Referring to the drawings, FIG. 1 is a pictorial representation of the mechanical portion of a disc drive 10 that can include a head constructed in accordance with an aspect of the disclosure. The disc drive includes a housing 12 (with the upper portion removed and the lower portion visible in this view) sized and configured to contain the various components of the disc drive 10. The disc drive 10 includes a spindle motor 14 for rotating at least one data storage medium 16 within the housing; in this case, a magnetic disc. At least one arm 18 is contained within the housing 12, with each arm 18 having a first end 20 with a transducer in the form of a recording and/or reading head or slider 22, and a second end 24 pivotally mounted on a shaft by a bearing 26. An actuator motor, which may be a voice coil motor 28, is located at the arm's second end 24, for pivoting the arm 18 to position the head 22 to a desired position. The actuator motor 28 is controlled by a controller that is not shown in this view. The data storage medium 16 includes a plurality of servo sectors 30 arranged between a plurality of data sectors 32. The data and servo information is contained in a plurality of tracks 34.

Servo-track writing is typically done before the storage medium is put in the drive on a special tool, the multi-disk writer. In one aspect, the disclosure relates to recording heads that can be used in multi-disk writers or other devices used to write servo information to a storage medium. Various known positioning devices can be used to position the recording head adjacent to the storage medium.

Figure 2:
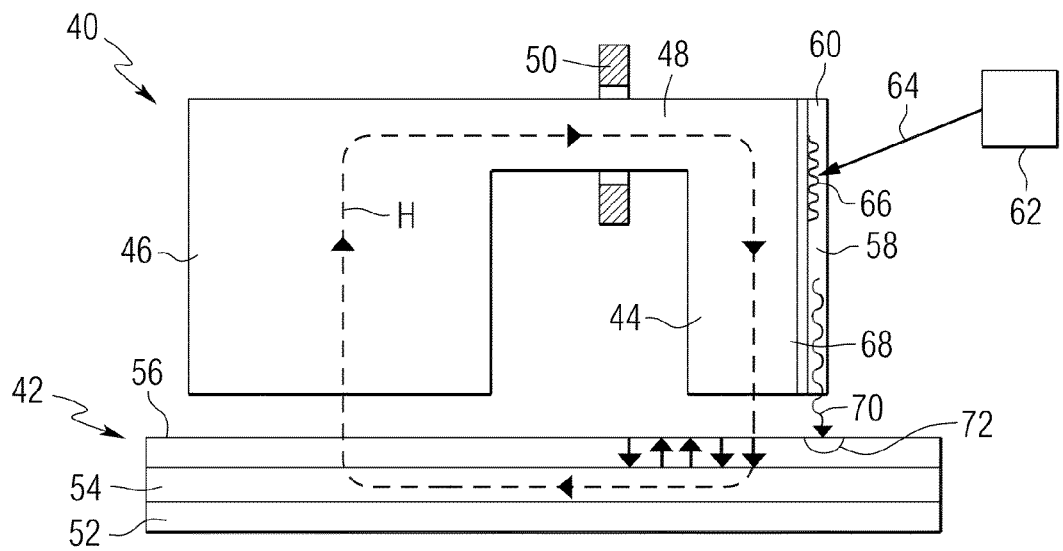
FIG. 2 is a schematic representation of a recording head and storage medium.

FIG. 2 is a schematic representation of a heat-assisted magnetic recording head 40 that includes an optical transducer, in combination with a magnetic recording medium 42, which illustrates several components of a HAMR system. Although FIG. 2 shows a perpendicular magnetic recording head and a perpendicular magnetic recording medium, it will be appreciated that the disclosure may also be used in conjunction with other types of recording heads and/or recording mediums where it may be desirable to employ heat-assisted recording. The recording head 40, in this example, includes a writer section comprising a main write pole 44 and a return or opposing pole 46 that are magnetically coupled by a yoke or pedestal 48. A magnetization coil 50 surrounds the yoke or pedestal 48 for energizing the recording head 40. The recording head 40 may also include a read head (not shown) which may be any conventional type of read head as is generally known in the art.

Still referring to FIG. 2, the recording medium 42 is positioned adjacent to or under the recording head 40. The recording medium 42 includes a substrate 52, which may be made of any suitable material, such as ceramic glass or amorphous glass. A soft magnetic underlayer 54 is deposited on the substrate 52. The soft magnetic underlayer 54 may be made of any suitable material, such as, for example, alloys or multilayers having Co, Fe, Ni, Pd, Pt, or Ru. A hard magnetic recording layer 56 is deposited on the soft underlayer 54, with the perpendicular-oriented magnetic domains contained in the hard layer 56. Suitable hard magnetic materials for the hard magnetic recording layer 56 may include at least one material selected from, for example, FePt or CoCrPt alloys having a relatively-high anisotropy at ambient temperature.

The recording head 40 also includes a planar waveguide 58 that directs light received from a light source 62 onto a surface of a recording medium to heat the magnetic recording medium 42 proximate to where the write pole 44 applies the magnetic write field H to the recording medium 42. The planar waveguide 58 includes a light transmitting layer 60. The optical waveguide 58 acts in association with a light source 62 which transmits light, for example, via an optical path 64, that is coupled to the optical waveguide 58 by a coupling means such as a grating 66. The light source 62 may be, for example, a laser diode or other suitable source of electromagnetic radiation. This arrangement provides for the generation of a guided mode that propagates through the optical waveguide 58 toward the recording medium. Electromagnetic radiation, generally designated by reference number 70, is transmitted from the waveguide 58 for heating the recording medium 42, and particularly for heating a localized area 72 of the recording layer 56. For the purposes of this description, electromagnetic radiation is generally referred to as light.

Figure 3:
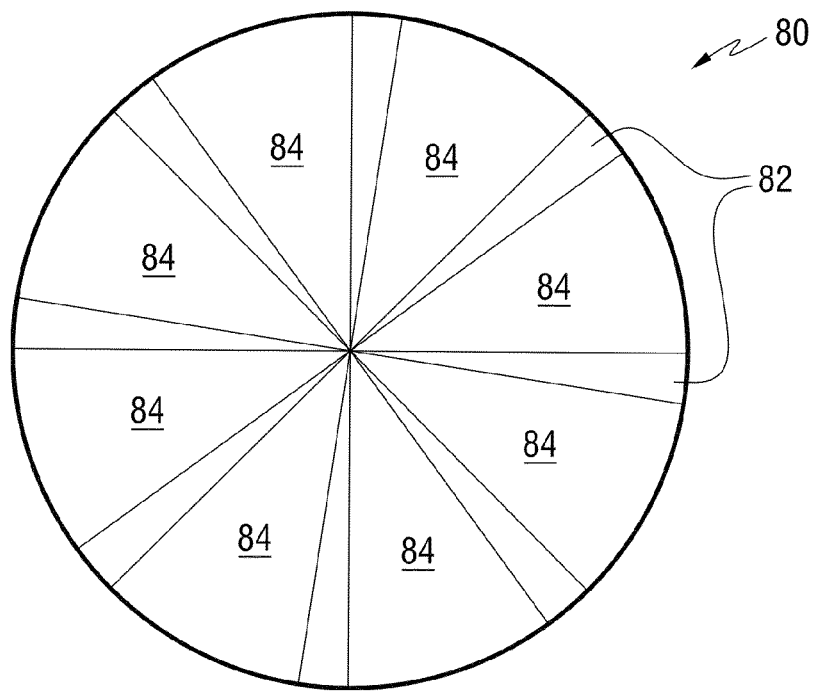
FIG. 3 is a schematic representation of a storage medium.

FIG. 3 is a schematic representation of a storage medium 80 including servo fields 82 and data fields 84 positioned in wedges on the medium. The magnetic recording system extracts the head position information relative to the data sectors from the servo data written on the servo wedges, and then either writes encoded user data to specific locations in the data fields using a write head (i.e., a write operation) or reads encoded user data from specific locations in the data fields using a read head (i.e., a read operation).

In one aspect, this disclosure provides a recording head using a waveguide in the form of a solid immersion mirror ("SIM") to produce a spot of light at a focal point, where the SIM spot is partially blocked to create a sharp cross-track thermal gradient on one side of the track. In another aspect, this disclosure provides a recording head using a channel waveguide to produce a spot of light, where an end of the channel waveguide is partially blocked. Such heads are particularly useful in the specific applications of writing servo-tracks and/or writing overlapping tracks with a very high density.

Figure 4:
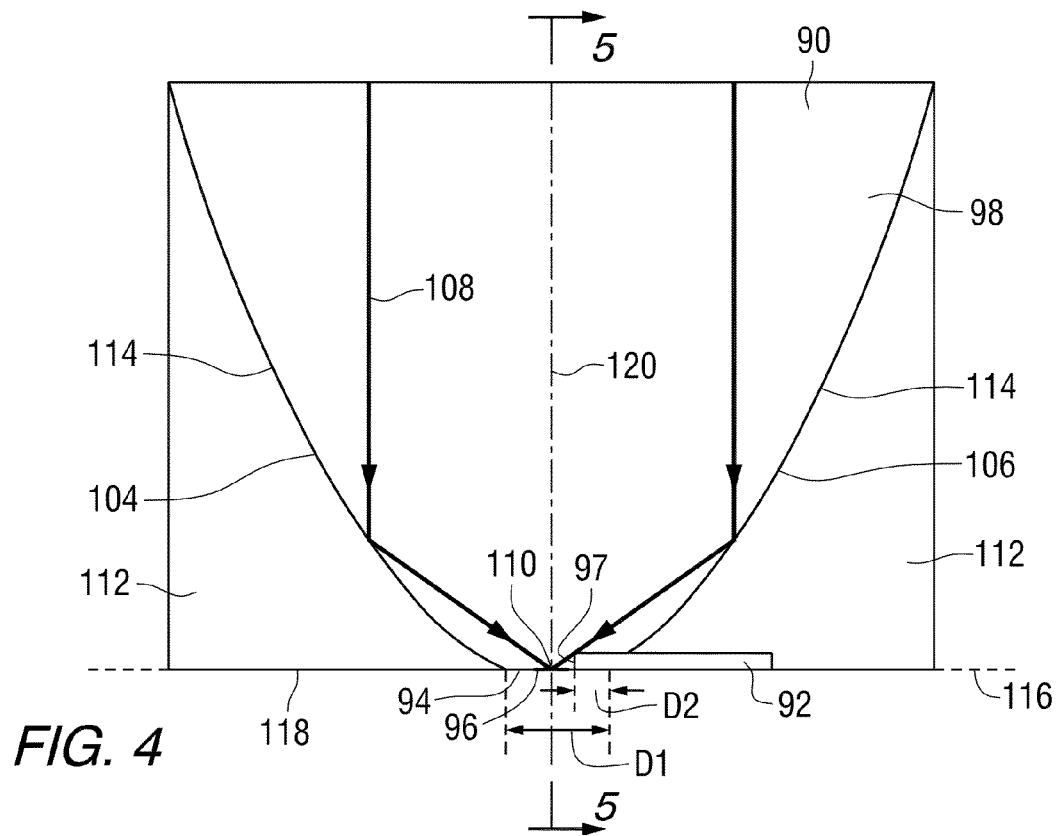
FIG. 4 is a cross-sectional view of a portion of a waveguide and blocking film.
Figure 5:
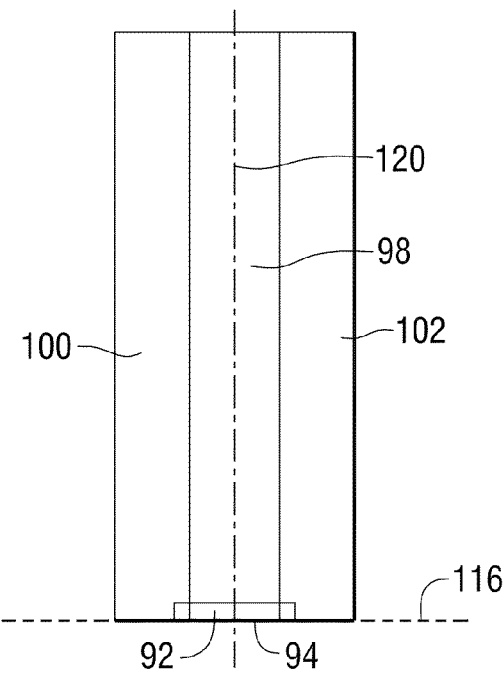
FIG. 5 is a cross-sectional view of a portion of the waveguide and blocking film of FIG. 4 taken along line 5-5.

FIG. 4 is a cross-sectional view of a portion of a solid immersion mirror waveguide 90 and a blocking film 92 adjacent to a truncated end 94 of the SIM to form an aperture 96. FIG. 5 is a cross-sectional view of a portion of the waveguide and blocking film of FIG. 4, taken along line 5-5. In one embodiment, the edge 97 of the blocking film is substantially straight in a direction perpendicular to the plane of FIG. 4.

As shown in FIGS. 4 and 5, the waveguide includes a core layer 98 and cladding layers 100, 102 on opposite sides of the core layer. The core layer has a refractive index greater than the refractive index of the cladding layers 100, 102. The core layer includes sides 104, 106 that are shaped to direct light, as illustrated by arrows 108, to a focal region 110. Cladding material 112 adjacent to the sides 104, 106 has a refractive index less than a refractive index of the core layer. A layer of reflective material 114 can be positioned adjacent to the sides 104, 106. In one embodiment, the sides 104, 106 are parabolically shaped.

When the waveguide is used in a recording head, the truncated end 94 is positioned on a plane 116 that is adjacent to or coincident with an air bearing surface ("ABS") 118. The blocking film 92 is positioned adjacent to the ABS and can be a metallic film. Aluminum is useful because it has such a short skin depth; meaning that very thin films will be opaque. Other materials with small skin depths that can be used include ruthenium, rhodium, and tungsten.

Additional materials that can be used for the blocking film include gold, silver, and copper, which can also be made opaque with somewhat thicker films. Gold is desirable because of its corrosion resistance, but it is also a very soft metal, so various gold alloys with greater hardness, good corrosion resistance, and small skin depths may be preferable.

The core layer includes edges that are shaped to reflect the electromagnetic waves toward a focal point of the core layer of the waveguide. As illustrated, the edges may have a substantially parabolic shape for reflecting the electromagnetic waves generally toward the focal point. However, it should be understood that other edge shapes can be used if the incoming electromagnetic wave is conditioned such that the combination of the wave characteristics and the edge shape result in the desired focusing of the wave generally at the focal point.

When used to write data to a recording medium, the truncated end SIM is positioned adjacent the recording medium. The sides of the SIM terminate at the truncated end 94 and are separated at the truncated end 94 by a distance D1, for example, in the range of about 3000 nm to about 9000 nm. The distance D1 may vary depending, for example, on the particular shape of the edges that are selected for forming the core layer. The blocking film extends across the opening between the SIM edges for a distance D2, so that there is a large concentration of energy being transmitted from the truncated end 94. The focal point of the SIM in the illustrated embodiment is positioned on a central axis 120 and adjacent to the truncated end 94.

In one example, the edge of the blocking layer can be positioned from a center line of waveguide at a distance in the range from 0 nm to about 415 nm. In another example, the edge of the blocking layer is positioned from a center line of waveguide at a distance of up to half the wavelength of light in the waveguide.

The truncated end 94 may be substantially contained within a first plane 116 that is substantially perpendicular to a second plane (along line 120) that is positioned in the planar waveguide or the core layer thereof. However, it will be appreciated that the truncated end 94 may be contained in a plane that is oriented other than perpendicular to the plane of the waveguide.

Advantageously, by truncating an end of the waveguide and using a blocking film adjacent to the truncated end 94, a desired localized heating of the recording medium can be achieved. The core material may be, for example, $Ta_2O_5$, $TiO_2$, ZnSe, Si, SiN, GaP, or GaN, and the cladding material may be, for example, air, $MgF_2$, $SiO_2$, or $Al_2O_3$. The reflective material along the edges of the SIM may be formed of, for example, Au, Ag, Al, Cu, Pt, or Ir. The core layer should be sufficiently thick to contain substantially all of the evanescent fields from the waveguide modes.

In various examples, the core layer can have a thickness in the range of about 100 nm to about 150 nm (for example, 125 nm for 830 nm light, or 85 nm for 488 nm light), and the cladding layers can have a thickness of about 500 nm to about 800 nm. The distance between the sides at the truncated end 94 can be in range from about 3000 nm to about 6000 nm. The distance from the sides can be twice the focal length of the SIM.

An edge of the blocking layer can be positioned away from a center line of the waveguide at a distance in the range from 0 nm to about 415 nm. The blocking layer forms a single-sided aperture. The aperture can have a width in a range from about 250 nm to about 6000 nm. The blocking layer can have a thickness in a range from about 5 nm to about 50 nm. Generally, the blocking layer thickness should be equal to or greater than the skin depth of the material used for the blocking layer.

A SIM-only head with a single-sided blocking film having an edge placed at between 0 nm and 50 nm from the center of the optical spot has nearly the same cross-track gradient as an NFT. In one example, the blocking film used to form the aperture is a 10 nm thick aluminum film.

Figure 6:
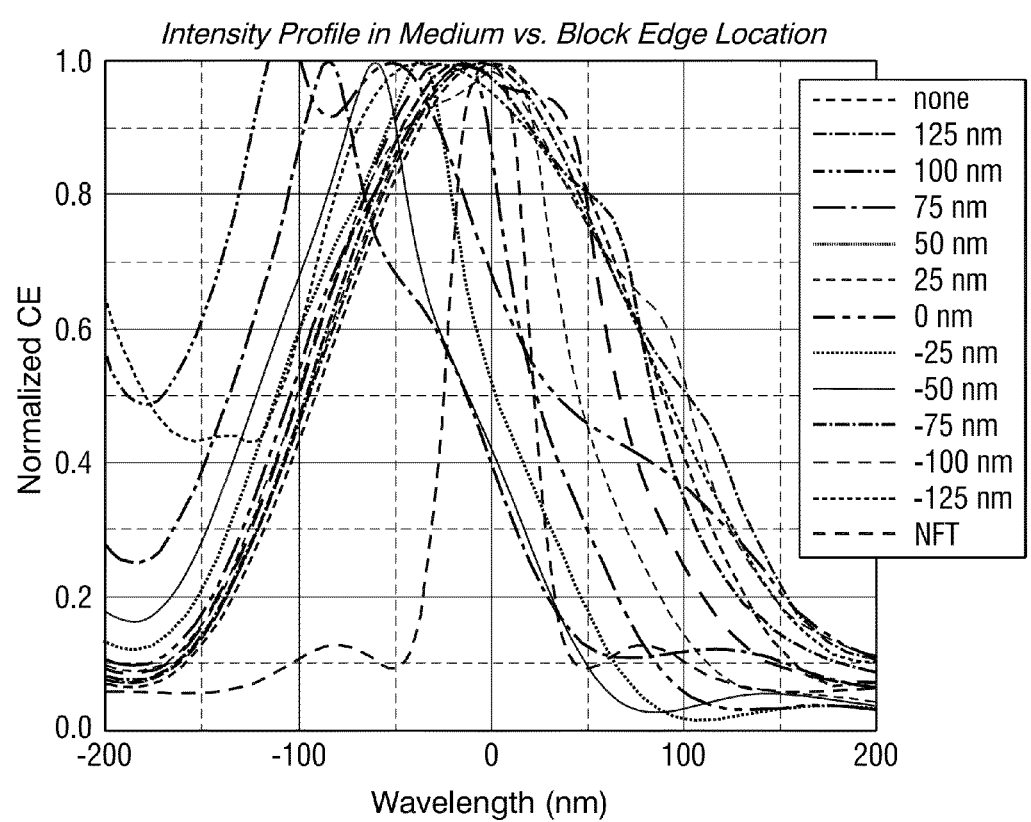
FIG. 6 is a graph of normalized coupling efficiency versus wavelength for various blocking film edge locations.

FIG. 6 is a graph of normalized coupling efficiency versus wavelength for various blocking film edge locations. The legend indicates the distance from the SIM center line 120 to the edge 97 of the blocking layer, as shown in FIG. 4.

Figure 7:
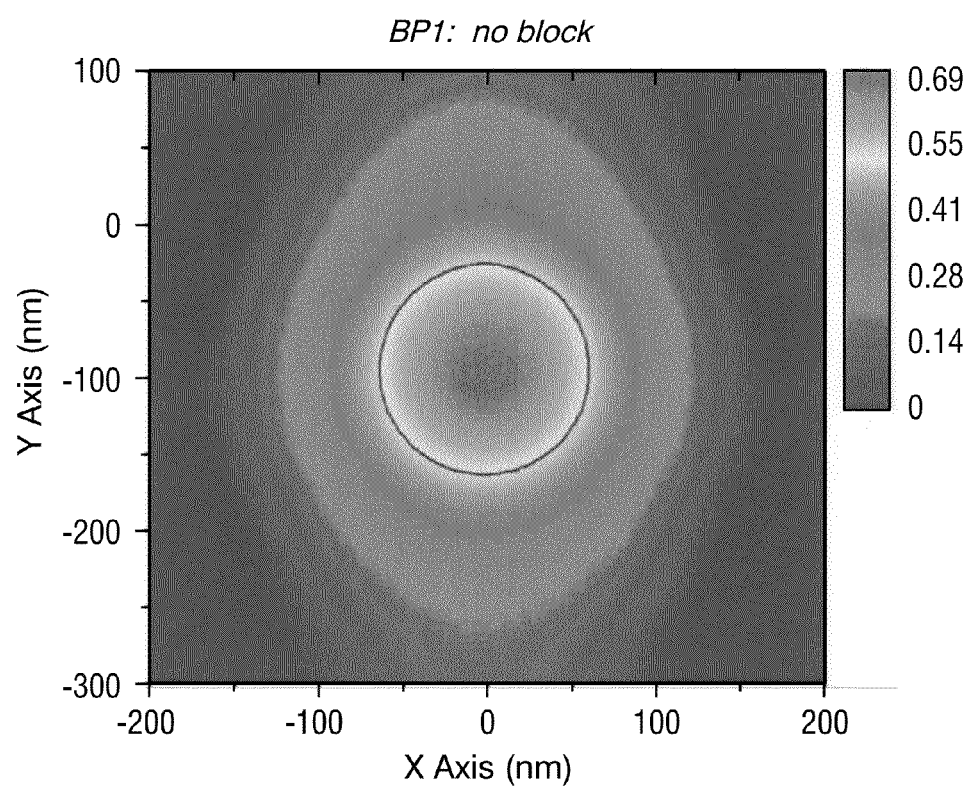
FIGS. 7 and 8 are calculated thermal profiles of a heated portion of a recording medium.
Figure 8:
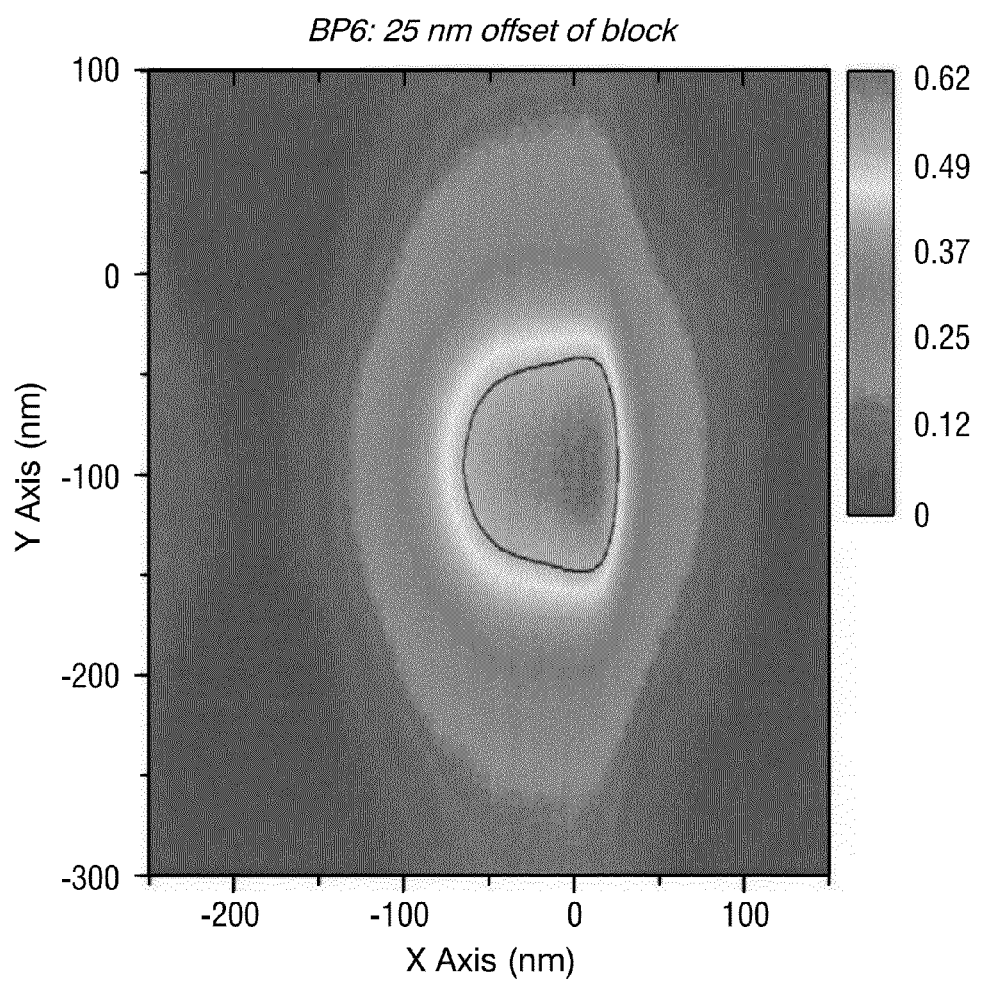

FIGS. 7 and 8 are calculated thermal profiles of a heated portion of a recording medium. The X-direction corresponds to a cross-track direction, and the Y-direction corresponds to a down-track direction.

FIG. 7 shows a calculated thermal profile of a heated portion of a recording medium for an optical spot produced using a SIM-only structure with no blocking layer at the ABS. In this case, the spot is nearly circular. This is not a good option for writing servo tracks with the desired sharp edges.

FIG. 8 shows a calculated thermal profile of a heated portion of a recording medium for an optical spot produced using a SIM-only structure when a 10 nm-thick aluminum blocking layer is placed at the ABS with the edge of the blocking layer being offset by 25 nm from the center of the SIM.

As shown in FIG. 8, the peak field intensity in the medium is only slightly smaller than when the blocking film is not present. However, the right side of the optical spot has been greatly flattened, as seen by the contour line at 0.5 (arbitrary units). Of course, thermal properties of the medium will tend to cause the thermal spot to broaden and become rounder. In practice, the optical power from the laser should be adjusted, so that the highest optical gradient occurs near the Curie point of the medium. If this is done, then, according to the plot in FIG. 8, the thermal field gradient on one side of the head is nearly as sharp as that of an NFT head. This design would allow for both shingled track and servo-track writing with track pitch of 100 nm or less.

Figure 9:
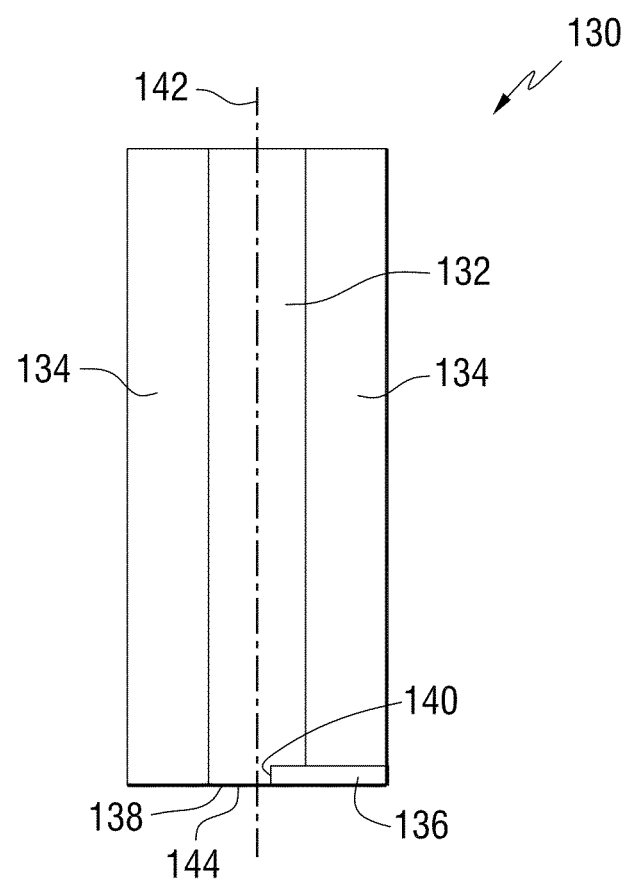
FIG. 9 is a cross-sectional view of a portion of another waveguide and blocking film.

FIG. 9 is a cross-sectional view of a portion of another waveguide and blocking film. In this example, the waveguide 130 is a channel waveguide having a core 132 which can have a generally-rectangular, cross-sectional shape in a plane perpendicular to the plane of the drawing. The core 132 is surrounded by a cladding 134 of a material having a lower dielectric constant than that of the core material. A blocking layer 136 extends from one edge of the core layer to partially cover an end 138 of the waveguide core. In one example, the waveguide core has a width of 120 nm and a thickness of 125 nm. An edge 140 of the blocking layer can be positioned at the centerline 142 of the waveguide, or the edge can be spaced from the centerline to form an opening 144. With a channel waveguide, the light is mode confined in the core layer. The materials used for the waveguide and blocking layer can be the materials described above for the SIM example.

In one aspect, the disclosure provides an apparatus including a recording medium, a recording head including a waveguide adjacent to the write pole, the waveguide having a truncated end, and a blocking layer positioned adjacent the truncated end and extending from one side of the waveguide across a portion of an aperture at the truncated end, and a positioning device for positioning the recording head adjacent to the recording medium. The waveguide can be a planar waveguide having sides shaped to direct an electromagnetic wave to a focal point adjacent to a truncated end of the waveguide. The sides of the waveguide can be substantially parabolically shaped. The planar waveguide can include a core layer having a thickness in the range of about 100 nm to about 1500 nm. In another embodiment, the waveguide can be a channel waveguide. An edge of the blocking layer can be positioned from a center line of the waveguide at a distance up to one half of the wavelength of light in the waveguide. An edge of the blocking layer is positioned from a center line of waveguide at a distance in the range from 0 nm to about 415 nm. The distance between the sides at the truncated end can be in a range from about 120 nm to about 9000 nm. The blocking layer can have a thickness of about 5 nm to about 50 nm.

It is to be understood that, even though numerous characteristics and advantages of various embodiments of the present invention have been set forth in the foregoing description together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed. For example, the particular elements may vary depending on the particular application without departing from the spirit and scope of the present invention.

What is claimed is:

1. An apparatus comprising:
 a write pole;
 a waveguide adjacent to the write pole, the waveguide having a truncated end and an interior surface that converges optical light to a focal point that is axially centered with respect to an aperture at the truncated end; and
 a blocking layer positioned adjacent the truncated end and extending from a single side of the waveguide across a portion of the aperture at the truncated end to output a non-uniform beam from the waveguide.

2. The apparatus of claim 1, wherein the blocking layer comprises a linear edge that extends across the aperture adjacent the focal point to provide a substantially D-shaped opening for the beam.

3. The apparatus of claim 1, wherein the interior surface is substantially parabolically shaped.

4. The apparatus of claim 1, wherein the planar waveguide includes a core layer having a thickness in the range of about 100 nm to about 1500 nm.

5. The apparatus of claim 1, wherein the waveguide is a channel waveguide.

6. The apparatus of claim 1, wherein an edge of the blocking layer is positioned from a center line of the waveguide at a distance up to one half of the wavelength of light in the waveguide.

7. The apparatus of claim 1, wherein an edge of the blocking layer is positioned from a center line of the waveguide at a distance in the range from 0 nm to about 415 nm.

8. The apparatus of claim 1, wherein a distance between opposing sides of the aperture at the truncated end of the waveguide is in a range from about 120 nm to about 9000 nm.

9. The apparatus of claim 1, wherein the blocking layer has a thickness of about 5 nm to about 50 nm.

10. The apparatus of claim 1, wherein the blocking layer covers less than 180 degrees of the circumferential edge of the aperture.

11. An apparatus comprising:
a recording medium;
a recording head comprising a waveguide adjacent to a write pole and an offset blocking layer positioned adjacent a truncated end of the waveguide and extending from only one side of the waveguide across a portion of an aperture at the truncated end that outputs a beam with a flattened, non-uniform cross-sectional shape onto the recording medium; and
a positioning device for positioning the recording head adjacent to the recording medium.

12. The apparatus of claim 11, wherein the waveguide is a planar waveguide having an interior surface shaped to direct an electromagnetic wave to a focal point axially centered in the aperture defined by the truncated end of the waveguide, and the blocking layer extends from a single side of the waveguide to partially cover the aperture to form a substantially D-shaped opening through which the beam passes to the recording medium, wherein the focal point is offset within the aperture.

13. The apparatus of claim 12, wherein the interior surface is substantially parabolically shaped.

14. The apparatus of claim 12, wherein the planar waveguide includes a core layer having a thickness in the range of about 100 nm to about 1500 nm.

15. The apparatus of claim 11, wherein the waveguide is a channel waveguide.

16. The apparatus of claim 11, wherein an edge of the blocking layer is positioned from a center line of the waveguide at a distance up to one half of the wavelength of light in the waveguide.

17. An apparatus comprising:
a write pole adapted to impart a magnetic field to an adjacent recording medium to write data thereto; and
a waveguide adjacent the write pole adapted to impart a flattened, non-circular optical heating beam to the recording medium, the waveguide comprising a non-symmetric opening offset with respect to a central axis of the waveguide along which the beam extends; and
an offset blocking layer positioned adjacent the waveguide, the offset blocking layer extending from only one side of the waveguide across a portion of an aperture provided by the waveguide.

18. The apparatus of claim 17, in which the waveguide comprises a body portion with an interior parabolic channel which terminates at the aperture symmetrically about the central axis, and the offset blocking layer affixed to the body portion which partially covers the first aperture to provide a substantially D-shape.

19. The apparatus of claim 17, in which the waveguide comprises a body portion with an interior annular channel with a rectangular cross-sectional shape in a plane perpendicular to the central axis and which terminates at a rectangular aperture with opposing first and second sides and opposing third and fourth sides, and the offset blocking layer which partially covers the respective first and second sides and fully covers the third side, the fourth side remaining uncovered to form the non-symmetric opening.

20. The apparatus of claim 17, characterized as a servo-writer transducer adapted to write a servo pattern to the recording medium to facilitate subsequent positioning of a data transducer adjacent the recording medium.

* * * * *

UNITED STATES PATENT AND TRADEMARK OFFICE
CERTIFICATE OF CORRECTION

PATENT NO. : 8,787,126 B2
APPLICATION NO. : 13/269809
DATED : July 22, 2014
INVENTOR(S) : Nils Jan Gokemeijer and William Albert Challener It is certified that error appears in the above-identified patent and that said Letters Patent is hereby corrected as shown below:

In the Claims

In Col. 8, Line 16
delete "first"

Signed and Sealed this
Seventh Day of April, 2015

Michelle K. Lee
*Director of the United States Patent and Trademark Office*